Jan. 9, 1951  F. O. ALBERTSON ET AL  2,537,179
CHUCK
Filed Dec. 4, 1947  4 Sheets-Sheet 1

Inventors:
Frans O. Albertson,
Jens Axel W. Madsen
BY Albert G. McCaleb
atty.

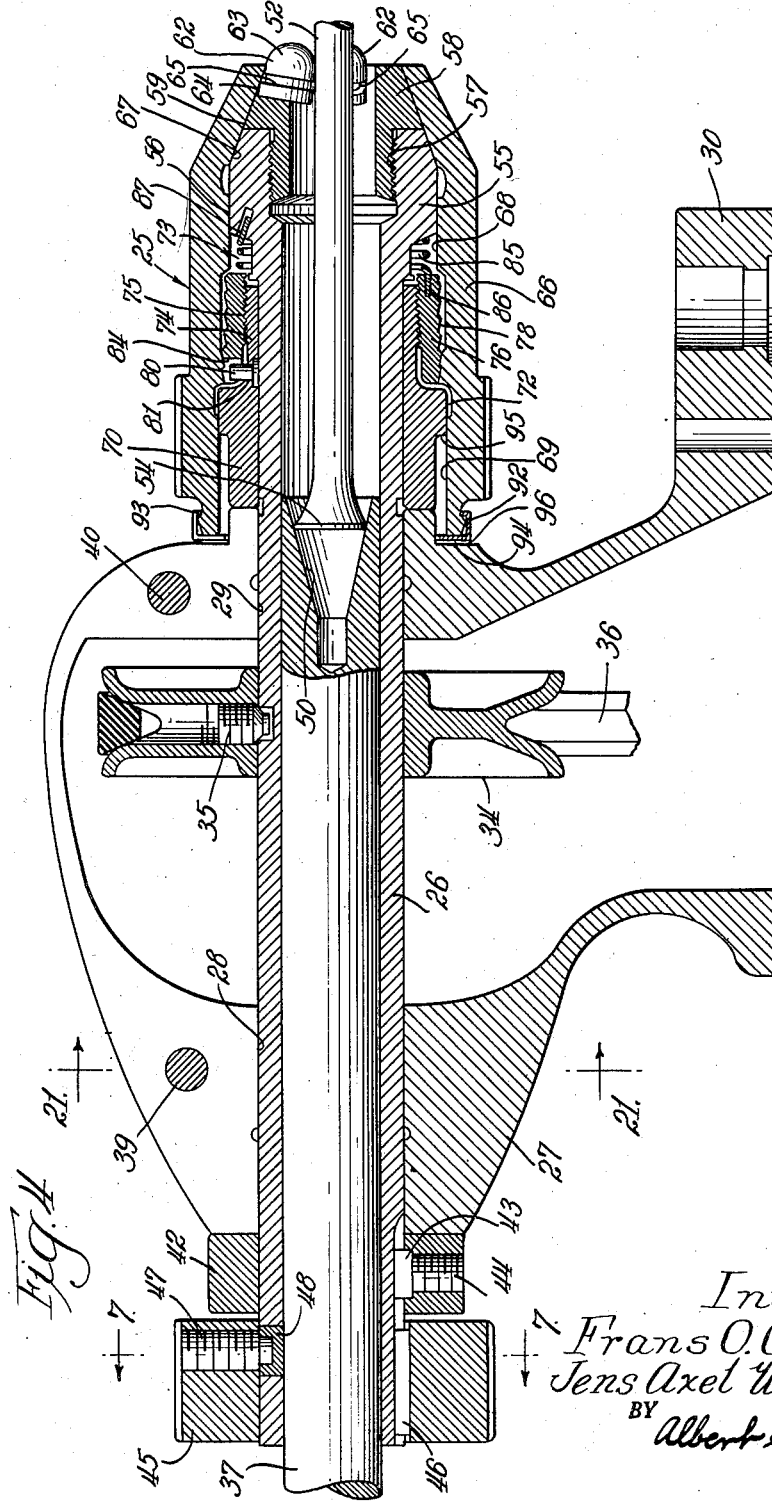

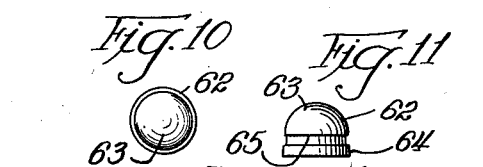

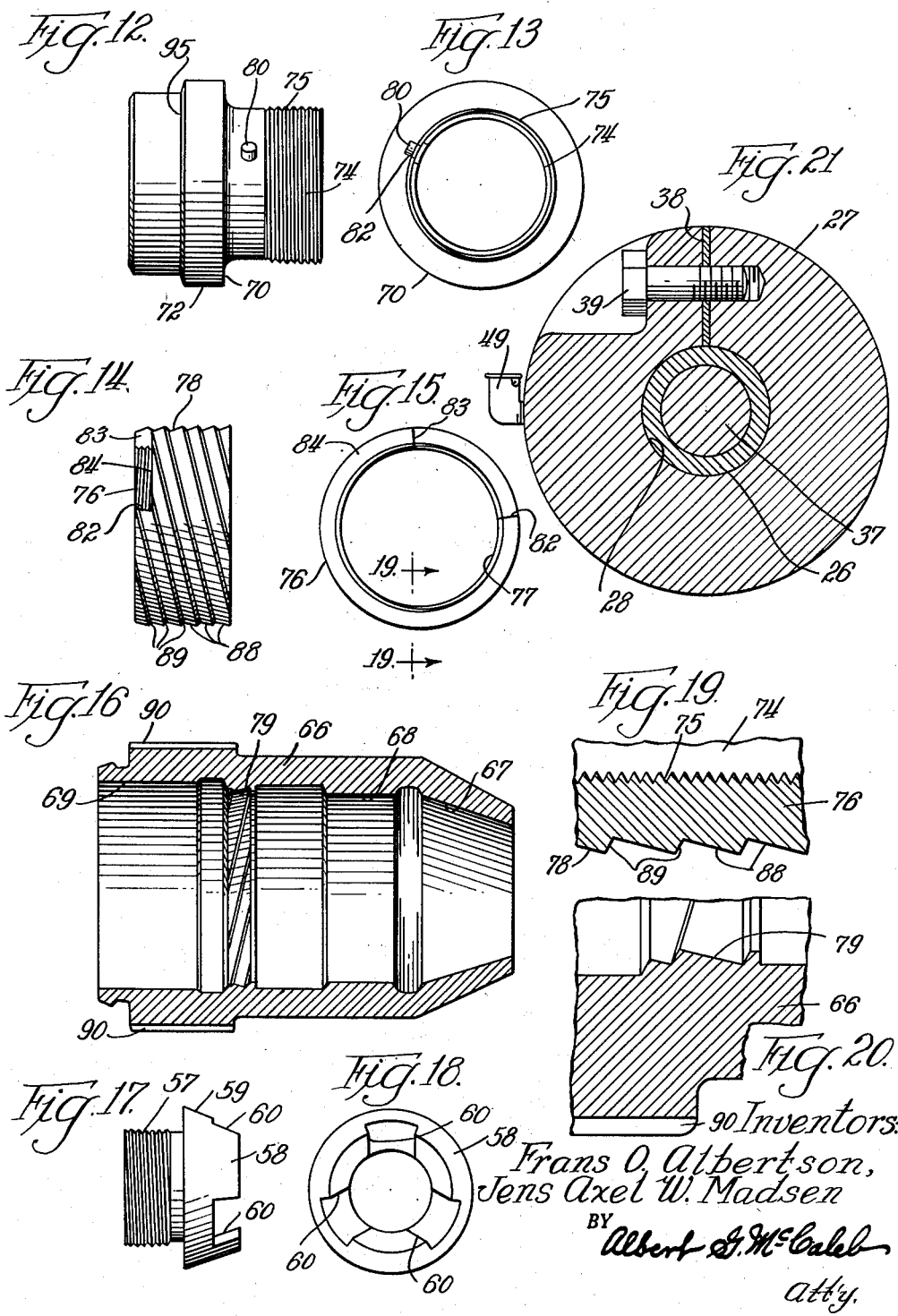

Patented Jan. 9, 1951

2,537,179

UNITED STATES PATENT OFFICE 2,537,179

CHUCK

Frans O. Albertson and Jens Axel W. Madsen, Sioux City, Iowa, assignors to Albertson & Company, Inc., Sioux City, Iowa, a corporation of Iowa Application December 4, 1947, Serial No. 789,606

14 Claims. (Cl. 279—75)

1

This invention relates generally to chucks of the type adapted to the gripping and/or centering of work pieces and suited to use on machines including those used for grinding operations.

It is a general object of our invention to provide a chuck having parts constructed and arranged to effect quick movements of gripping elements between positions of relatively considerable separation by manual operation of an actuating element.

As another object, our invention has within its purview the provision of a chuck adapted to quick operation through a considerable range of movement of the gripping elements without the sacrifice of gripping power for holding work pieces of various sizes.

Our invention also comprehends the provision of a chuck of the class referred to which embodies relatively few parts and may be readily assembled in production, as well as disassembled and assembled for cleaning and service.

A further object of the invention is to provide a chuck having high mechanical advantage for effecting the final gripping action and wherein the actuating mechanism embodies elements in a relationship such that jamming of the chuck and damage to the workpiece are prevented.

Considered more specifically, this invention comprehends a structure wherein two threads having different leads and sectional shapes are utilized to accomplish rapid part motion, on the one hand, and high mechanical advantage on the other; the two threads being so arranged and related that the frictional force in one varies to control the action of the other.

As a further adjunct to the threaded parts referred to, our invention also comprehends the use of spring and stop elements for effecting consistent positioning and operation of the threaded parts.

Other objects and advantages of the invention will be apparent from the following description and the accompanying drawings in which similar characters of reference indicate similar parts through the several views.

Referring to the four sheets of drawings,

Fig. 1 is a side elevational view depicting the adaptation of a preferred embodiment of our chuck to a bench type machine for grinding valves and the like;

Figure 1:
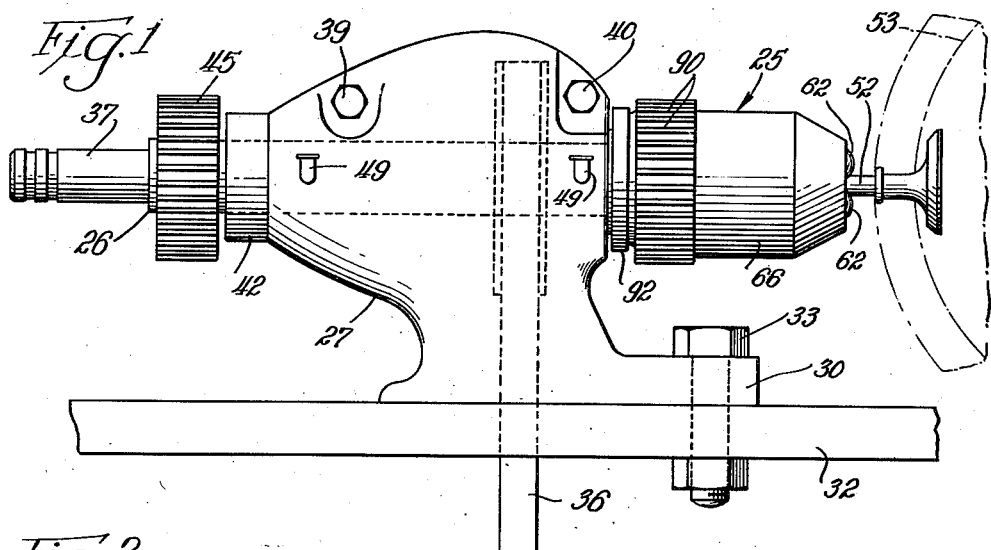
Figure 2:
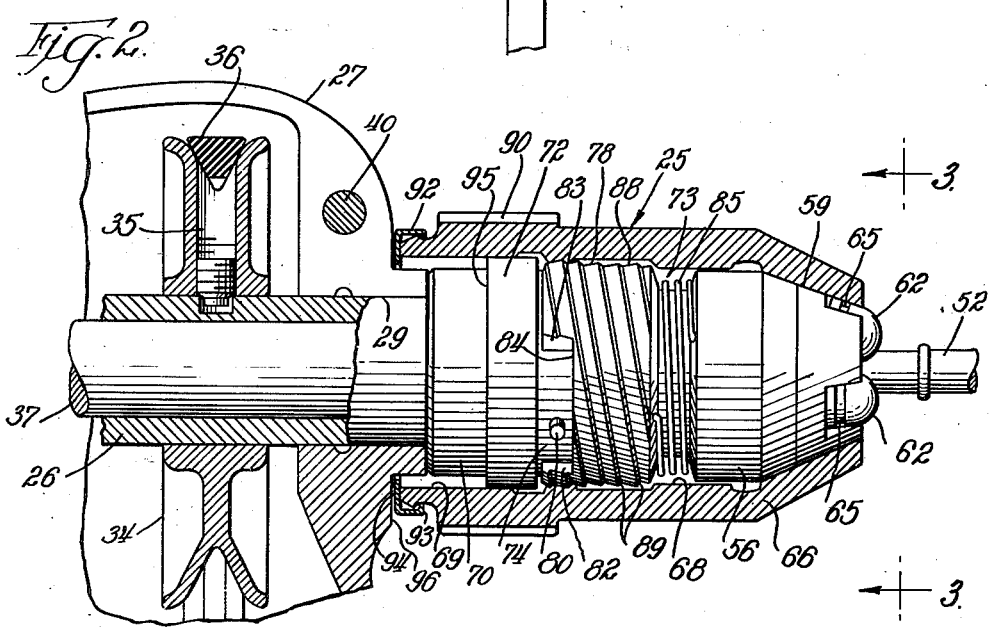
Fig. 2 is a fragmentary side view of a portion of the structure shown in Fig. 1, drawn to a larger scale, and having parts shown in section to illustrate certain internal portions of the structure.
Figure 3:
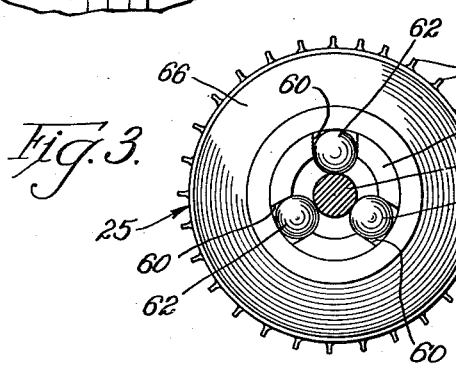
Fig. 3 is an end elevational view of a portion

2 of the structure shown in Fig. 2 and taken substantially as indicated by the line 3—3 in Fig. 2 and accompanying arrows;

Fig. 4 is a longitudinal side sectional view of the chuck and valve grinding machine shown in Fig. 1, drawn to a somewhat larger scale, and wherein the chuck parts are depicted in positions assumed while gripping a workpiece;

Fig. 5 is a fragmentary side sectional view of a portion of the structure shown in Fig. 4 and wherein the chuck parts are illustrated in their open positions;

Fig. 6 is an end sectional view taken at a position and in a direction indicated by a line 6—6 and accompanying arrows in Fig. 5;

Fig. 7 is an end sectional view taken substantially on a line 7—7 of Fig. 1 and in the direction indicated by the arrows;

Figs. 8 and 9 are respectively end elevational and side sectional views of a part utilized in our preferred chuck assembly, the section for Fig. 9 being taken substantially on a line 9—9 of Fig. 8 and in the direction of the arrows;

Figs. 10 and 11 are respectively end and side elevational views of a preferred form of gripping element adapted to use in our disclosed chuck;

Figs. 12 and 13 are respectively side and end elevational views of a sub-assembly utilized in the chuck structure shown in Figs. 1, 2 and 4;

Figs. 14 and 15 are respectively side and end elevational views of a preferred type of part utilized in the disclosed chuck assembly;

Fig. 16 is a longitudinal side sectional view depicting a preferred form of one of the parts utilized in the chuck assembly;

Figs. 17 and 18 are respectively side and end elevational views of a preferred form of another part utilized in the disclosed chuck assembly;

Fig. 19 is an enlarged fragmentary sectional view wherein the section is taken substantially as depicted by the line 19—19 and Fig. 15 and accompanying arrows;

Fig. 20 is an enlarged fragmentary sectional view of a portion of the structure illustrated in Fig. 16; and Fig. 21 is an end sectional view wherein the section is taken substantially as indicated by a line 21—21 and Fig. 4 and accompanying arrows.

Although the chuck structure disclosed herein is suited to many and various adaptations and uses wherein chucks are utilized for the holding and/or centering of various workpieces, tools and the like, the illustrative embodiment of our invention which is disclosed herein for exemplary purposes is applied to a bench type machine for grinding valves and the like. In its general association for the disclosed purpose, and as shown in Fig. 1, a chuck 25 is mounted on one end of a spindle 26, which spindle is supported for rotation by a housing 27 having journal bearings 28 and 29 in which the spindle is carried and a base portion 30 which is adapted to be secured to a support such as a bench 32 by fastening means such as cap screws 33. As is usual in such machines, the spindle 26 has a pulley 34 secured thereto within the housing 27 by fastening means such as a set screw 35 and is adapted to be driven from a suitable prime mover through a driving element such a belt 36. As is also usual, the spindle 26 is hollow and has a centering device 37 adjustably mounted therein through the end of the spindle opposite the chuck.

As illustrated in Figs. 1, 4 and 21, the journal bearings 28 and 29 are preferably adjustable within limits by varying the thickness of shims such as 38 at one side of the bearings and adjusting cap screws 39 and 40 to compensate for wear. Also, the spindle 26 is located axially relative to the housing 27 at the end opposite the chuck 25 by a collar 42 which is preferably non-rotatably locked with respect to the spindle by a key 43 and fastening means such as a set screw 44. At the end opposite the chuck, the spindle 26 preferably projects beyond the housing 27 and collar 42 and has a knurled hand wheel 45 mounted thereon and secured thereto by key 46. Fastening means such as a set screw 47 threaded radially into the hand wheel 45 acts against a segment 48 which is movable in a slot 49 in one side of the spindle to serve as a clamp for holding the centering device 37 in an adjusted position axially of the spindle. The hand wheel 45 serves as a grip for holding the spindle during manual operation of the chuck 25. Oil cups 49 are preferably provided for lubricating the journal bearings 28 and 29.

As shown in Fig. 4, the disclosed centering device 37 is in the form of a shaft having a conical end bore 50 facing toward the chuck end of the spindle and adapted to receive and center the end of a workpiece such as the depicted valve stem 52. In use, the position of the centering device 37 axially of the spindle 25 is adjusted by the loosening and tightening of the set screw 47 to lock the conical bore 50 at a position such that a desired portion of the workpiece is exposed beyond the end of the chuck. In the particular adaptation disclosed, wherein the workpiece is a valve of the type used in internal combustion engines, the apparatus may be utilized for grinding the seat surfaces of the valve by the association thereof with a grinding wheel as depicted in dot and dash lines at 53 in Fig. 1.

Since various types of workpieces have protubances or enlarged portions of limited length along their outer surfaces which must be passed by a chuck before the smaller clamping portion of the workpiece is reached, a relatively wide range of movement of the chuck clamping elements is required to effect the insertion and clamping of the workpiece. In the disclosed instance, the valve stem 52 has thereon a mushroom end portion 54 which must pass between the chuck gripping elements during its insertion into the chuck. Thus, a wider range of movement of the chuck gripping elements is required with such workpieces than with those of uniform size.

In order to have relatively strong gripping force obtainable for holding the workpiece without necessitating an undue loss of time for accomplishing the opening and closing of the chuck in changing workpieces, the disclosed chuck embodies an operating mechanism incorporating one set of threads between operating elements for accomplishing quick action of the clamping elements through a relatively wide range of movement and a second set of threads between different operating parts for providing the mechanical advantage necessary for strong gripping action.

Considering the structure of the disclosed chuck in greater detail, it is by preference that the chuck end of the spindle 26 has a diametrically enlarged end portion 55 on the outside of which is a substantially cylindrical bearing surface 56 and which is internally counter-bored and threaded at 57 to receive a hardened metal insert 58. Adjacent portions of the enlarged spindle end portion 55 and the outer surface of the insert 58 are conformed to provide a frusto-conical surface 59. In its outer end, the hardened insert 58 has a number of radial slots 60 greater than two which open endwise of the insert and are desirably equally spaced circumferentially of the insert.

In the disclosed embodiment of our invention, the slots 60 are dove tailed in shape, wider at their bases than at their open ends and receive gripping elements 62 for sliding movement therein radially of the spindle. As shown in Figs. 4, 10 and 11, the gripping elements utilized have substantial spherical gripping end portions 63 which project from the slots 60 and have tapered side portions 64 which are retained within the slots. Also the gripping elements preferably have circumferential grooves 65 near the bases thereof. With the type of gripping elements disclosed, and when the diameter of the spindle opening is large as compared to the diameters of the gripping elements, it is further desirable that the slots 60 shall taper radially so that their inner ends are sufficiently narrow to retain the gripping elements and prevent their movement radially into the spindle opening when there is no workpiece in the chuck.

A chuck cap 66 is mounted for axial and rotational movements on the projecting end portion of the spindle 26 and has an internal frusto-conical surface 67, as shown in Figs. 4, 5 and 16, conforming substantially to the frusto-conical spindle end surface 59 for determining the positions of the gripping elements 62 and applying gripping force thereto. Near the frusto-conical inner end surface 67, the cap 66 has an internal cylindrical bearing surface 68 adapted to fit and move relative to the bearing surface 56 on the outer end of the spindle. At its other end, the cap 66 has a second internal cylindrical bearing surface 69 adapted to provide additional support for the cap during its longitudinal and rotational movements. A sleeve member 70 which is depicted in Figs. 4, 5, 12 and 13 is shrunk onto or otherwise fixedly secured to the projecting end portion of the spindle and has an external cylindrical bearing surface 72 which fits the internal bearing surface 69 of the cap 66. In the disclosed embodiment of our chuck, the diameters of the bearing surfaces 56 and 72 are considerable larger than the diameter of the main stem portion of the spindle and are spaced axially of the spindle to provide a recess 73 therebetween which extends circumferentially and axially of the spindle. Furthermore, the diameter of the bearing surface 72 on the sleeve 70 is desirably somewhat larger than the diameter of the bearing surface 56 near the end of the spindle so that the cap may readily be applied to and removed from the projecting end of the spindle.

An operating mechanism by which the position of the cap 66 axially of the projecting end of the spindle is determined in relation to the rotational position thereof includes an end portion 74 on the sleeve 70 which is of considerable smaller diameter than the bearing surface 72 on the sleeve and has thereon external threads 75 which, in the disclosed structure, are relatively fine, have relatively small lead and are of substantial convention V-shape. The collar 76 shown in Figs. 4, 5, 14 and 15, has internal threads 77 which fit the threads 75 on the end portion 74 of the sleeve for relatively free rotational movement thereon. The collar 76 also has relatively coarse threads 78 on its outer surface, which threads have a longer lead than the internal threads 75. The coarser outer threads of the collar 76 engage internal threads 79 in the cap 66 which are disposed between the bearing surfaces 68 and 69 in that cap. In order that the cap may be freely applied to the projecting end of the spindle, the internal diameter of the threads 79 is larger than the diameter of the bearing surface 56 at the outer end of the spindle.

For limiting the relative rotational movement between the collar 76 and the end portion of the sleeve 70, a stop pin 80 is inserted in and projects through an opening 81 in the end portion 74 of the sleeve for engagement with opposed ends 82 and 83 of a segmental slot 84 in one end of the collar 76. Also, a torsion spring 85 has an end 86 seated in a bore in the end of the collar 76 and another end 87 seated in a bore in the end portion 55 of the spindle. This spring is tensioned to bias the collar 76 in a direction tending to move the collar on its internal threads toward the projecting end of the spindle. Also, in the disclosed embodiment, the collar is biased by the spring 85 to a position such that the stop pin 80 engages the end surface 83 of the slot 84.

Having relatively long lead it may be readily understood that rotational movement of the cap 66 on the external threads 78 of the collar 76 effects relatively rapid axially movement of the cap relatively to the spindle in proportion to the rotational movement. Since the collar 76 is normally biased by the spring 85 to a predetermined position and held there by the spring with sufficient force that normal free movement of the cap is between the cap and the collar 76 and on the relatively coarse threads, this normally free movement of the cap produces relatively rapid axial displacement thereof relative to the spindle. The radial positions of the gripping elements 62 being determined by the axial position of the internal frusto-conical surface 67 of the cap, the quick or rapid opening and closing movements of the gripping elements are effected by the rotational movement of the cap relative to the collar 76 on the coarse threads having the longer lead.

The threads 75 on the sleeve 70 and the threads 78 on the collar 76 have the same direction of progress. It therefore follows that when the axial movement of the cap on the coarse threads is resisted, as by engagement of the gripping elements 62 with the workpiece, as shown in Fig. 4, the greater lead and the build up of frictional resistance in the coarse threads 78 is sufficient to overcome the biasing force of the spring 85. Rotational movement then occurs between the collar 76 and the end portion 74 of the sleeve through movement on those parts on the finer threads. By such action, the increased mechanical advantage of the finer threads is utilized for effecting the final tightening movement of the gripping elements against the workpiece. In order to prevent jamming of the chuck parts or mutilation of the workpiece by the application of excessive force through the chuck, the length of the slot 84 is predetermined so that engagement of the end 82 of that slot with the stop pin 80 limits the gripping action which may be effected by movement of the parts on the fine threads internally of the collar 76.

When the cap 66 is turned to release the gripping force of the gripping elements against the workpiece, a small portion of the initial movement thereof relieves the pressure exerted through the coarse threads to an extent that the spring 85 returns the sleeve 76 to the normal position in which the stop pin 80 engages the end 83 of the slot 84. Further rotational movement of the cap occurs on the coarse threads and produces rapid opening movement of the gripping elements.

In order to improve the desired sequential operation between the threaded parts of the described chuck actuating mechanism, it is our preference that the coarse external threads on the collar 76 shall be of unsymmetrical section with relatively wide faces 88 sloping gradually away from the spindle axis toward the gripping end of the spindle and joined by steeply sloped and relatively narrow intervening faces 89. With this disposition and relationship of the thread faces, frictional resistance within the coarse threads builds up rapidly as force is applied to the gripping elements by the frusto-conical surfaces of the cap. The frictional resistance thus built up in the coarse threads is also amply sufficient to hold against the biasing force of the spring 85 to prevent the chuck from loosening while in use.

Circumferentially spaced, ribs 90 are provided on the outer surface of the cap 66 to form a gripping surface for the manual operation of the chuck. In our preferred structure, a split snap ring 92, shown in Figs. 2, 4, 5, 8 and 9, grips a shoulder 93 on the end of the cap 66 remote from the gripping elements and is resiliently and removably retained thereon. A radial flange 94 on the snap ring extends inwardly beyond the inner surface of the cap for engagement with a shoulder 95 on the sleeve 70 adjacent the bearing surface 72 to provide a stop effective during normal operation of the chuck for limiting the movement of the cap to a position such as that indicated in Fig. 5 at which the gripping elements are separable to their maximum extent. Removal of the cap may, however, be manually effected by continuing to turn the cap relative to the spindle to an extent such that the snap ring is spread and forced from its position of engagement with the shoulder 93 on the end of the cap. Upon replacement of the cap after the snap ring has been removed, engagement of the flange 94 with a shoulder 96 on the end of the housing 27 forces the ring to snap back into place.

In the initial assembly of the chuck, the collar 76 is threaded onto the end portion 74 of the sleeve 70 before the stop pin 80 is placed in the opening 82. After placement of the stop pin 80 sleeve 70 is mounted upon the spindle. Other than for the assembly of the collar 76, stop pin 80 and sleeve 70 open the spindle, the other parts may be assembled, disassembled or replaced either before or while the spindle is assembled with respect to the support which, in the present instance, is provided by the housing 27.

From the foregoing description and reference to the accompanying drawings, it may be readily appreciated that we have provided a chuck suited to a wide variety of uses and which is adapted to quick opening and closing actions without sacrificing strong gripping force. The parts of the chuck are individually rugged, relatively few in number and well suited to quantity production. In addition to the use of sequentially operable coarse and fine threads for producing quick opening and closing movements as well as providing the mechanical advantage necessary for strong gripping force, the parts of the chuck assume normal positions after each gripping operation so that consistent performance results and a stop pin is provided to prevent damage to the chuck or undesirable defacement of a workpiece. In addition, the main operating parts of the chuck may be readily disassembled and assembled for periodic cleaning and when necessary for the replacement of worn parts.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patents of the United States is:

1. A chuck for holding a workpiece and comprising, in combination, a hollow spindle having an internally threaded end portion and a workpiece centering element mounted therein from the other end, a hardened insert threaded into the threaded end portion of the spindle and projecting axially therefrom, said insert having slots in the projecting end thereof disposed radially of the axis of the spindle, gripping elements mounted in said slots for movements radially of the spindle axis, means providing axially spaced bearing surfaces on the outer surface of the spindle, a cap mounted for rotational and axial movements on said bearing surfaces and having an internal frusto-conical end surface for engagement with said gripping elements to control the positions thereof, a threaded element disposed between said bearing surfaces at a fixed position relative to said spindle, a collar threaded internally for relatively free movement along the threads of said threaded element and threaded externally for engagement and relative coaction with internal threads on said cap, stops for limiting the movements of said collar relative to the spindle, a spring biasing the collar to one extremity of movement relative to the spindle, and the internal and external threads on said collar having different leads.

2. A chuck as defined in claim 1, and wherein the external threads on said collar have greater lead than the internal threads thereon normally to effect rapid axial movement of the cap during rotation thereof relative to the spindle and while said spring controls the position of said collar, and the internal threads of said collar becoming effective in one direction of movement of the cap and as a result of increased resistance to movement of the threads having the greater lead when force is applied by the cap to the gripping elements.

3. A chuck as defined in claim 1, and wherein the external threads on said collar have greater lead than the internal threads thereon, said external threads being of unsymmetrical sectional shape and presenting surfaces having a gradual slope axially of the spindle in one direction so that frictional resistance to rotational movement builds up in said external threads when axial force is applied to the cap by the gripping elements, and the direction of rotational movement of the cap for effecting said build up of frictional resistance in the external threads being opposed to the biasing force of said spring.

4. A chuck for holding a workpiece and comprising, in combination, a hollow spindle having a frusto-conical end surface with radial slots therein, gripping elements disposed in said slots for movement radially of the spindle, a cylindrical bearing surface on the spindle, a cap mounted for rotational and axial movements on said bearing surface and having an internal frusto-conical end surface for engagement with said gripping elements during axial movements of the cap to effect control of the positions of the gripping elements, means providing threads on the spindle surface near said cylindrical bearing surface, a collar threaded internally for movement along the threads on the spindle, said collar and said cap also having engaging threads thereon externally of the collar and internally of the cap, the lead of the last mentioned threads being different than the lead of the internal threads of the collar, a stop for limiting relative movement between the spindle and collar, and a spring normally biasing the collar in one direction relative to the spindle.

5. A chuck as defined in claim 4, and wherein the direction of the internal threads on the collar is the same as that of the threads on the cap, and the direction of the biasing force of said spring being such that it tends to move the collar toward the frusto-conical end surface of the spindle.

6. A chuck as defined in claim 4, and wherein the engaging threads of the collar and cap are coarser in section and have a longer lead than the internal threads of the collar.

7. A chuck as defined in claim 4, and wherein said engaging threads of the collar and cap are of unsymmetrical sectional shape with that shape and the lead thereof as compared to that of the internal threads of the collar being selected to effect movement of said collar against the biasing force of said spring when movement of the cap relative to the spindle is resisted by the gripping elements so as to exert appreciable force axially of the threads.

8. A chuck as defined in claim 4, and wherein the engaging threads of the collar and cap are of unsymmetrical sectional shape with each thread having one face sloped steeply and the other face sloped gradually relative to the axis of the spindle, and the gradually sloped faces being disposed to effect increased friction as the force exerted by said cap on the gripping elements increases.

9. A chuck comprising, in combination, a spindle having an axial bearing surface thereon, a cap mounted for rotational and axial movements on said bearing surface, gripping elements carried by the spindle for actuation to and from gripping positions by axial movement of the cap relative to the spindle, and a mechanism for determining the position of the cap axially of the spindle in response to rotational movement thereof, which mechanism includes a collar provided with relatively fine internal threads having small lead and supported through said threads for limited movement relative to the spindle, said collar also having relatively coarse threads with longer lead on the external surface thereof, and said cap being internally threaded to fit the external threads on the collar.

10. A chuck as defined in claim 9 wherein a stop is provided for limiting the movement of the collar relative to the spindle, and a spring normally biases the collar in one direction relative to the spindle.

11. A chuck as defined in claim 9 wherein said relatively coarse threads on the external surface of the collar being of unsymmetrical section.

12. A chuck comprising, in combination, a spindle having an axial bearing surface thereon, a cap mounted for rotational and axial movements on said bearing surface, gripping elements carried by the spindle for actuation to and from gripping positions by axial movement of the cap relative to the spindle, and a collar having a normally movable threaded connection with the spindle and threadedly engaging said cap for movement relative thereto.

13. In a chuck having elements adapted to grip a workpiece, the combination comprising relatively movable gripping and actuating parts, a member providing a connecting element between said parts and having thereon two sets of threads, one of said sets of threads being relatively coarse and of unsymmetrical section and the other set being finer, and the sectional shape of said one set of threads being such that friction is increased therein as force is exerted through the threads in one direction.

14. In a chuck as defined in claim 13, the combination being further characterized by a stop for limiting the movement of said member on one set of threads, and a spring biasing said member in one direction relative to the last mentioned set of threads.

FRANS O. ALBERTSON.
JENS AXEL W. MADSEN.

REFERENCES CITED

The following references are of record in the file of this patent:

UNITED STATES PATENTS

| Number | Name | Date |
|--------|------|------|
| 323,178 | Mason | July 28, 1885 |
| 1,074,547 | Gummo | Sept. 30, 1913 |
| 1,251,558 | Morrow | Jan. 1, 1918 |
| 1,606,972 | Nielsen | Nov. 16, 1926 |
| 1,697,447 | Albertson | Jan. 1, 1929 |